(12) United States Patent
Schulz et al.

(10) Patent No.: US 11,788,666 B2
(45) Date of Patent: Oct. 17, 2023

(54) JOHNSTON COUPLING WITH ADDITIONAL VACUUM ENCLOSURE

(71) Applicant: NEXANS, Courbevoie (FR)

(72) Inventors: Holger Schulz, Hannover (DE); Christian Frohne, Hannover (DE)

(73) Assignee: NEXANS, Courbevoie (FR)

( * ) Notice: Subject to any disclaimer, the term of this patent is extended or adjusted under 35 U.S.C. 154(b) by 200 days.

(21) Appl. No.: 17/149,341

(22) Filed: Jan. 14, 2021

(65) Prior Publication Data
US 2021/0278028 A1 Sep. 9, 2021

(30) Foreign Application Priority Data

Jan. 17, 2020 (EP) .................................... 20305040

(51) Int. Cl.
*F16L 59/14* (2006.01)
*F16L 59/18* (2006.01)

(52) U.S. Cl.
CPC .......... *F16L 59/141* (2013.01); *F16L 59/184* (2013.01)

(58) Field of Classification Search
CPC ...... F16L 59/141; F16L 59/065; F16L 59/184
See application file for complete search history.

(56) References Cited

U.S. PATENT DOCUMENTS

| 3,137,143 | A | * | 6/1964 | Richards | F16L 59/065 |
| | | | | | 62/50.7 |
| 7,052,047 | B1 | * | 5/2006 | Box | F16L 59/184 |
| | | | | | 62/50.7 |

FOREIGN PATENT DOCUMENTS

| CN | 102606821 | A | * | 7/2012 |
| DE | 2164823 | A1 | * | 6/1973 |
| DE | 102015209124 | A1 | * | 11/2016 |
| JP | 07208684 | A | * | 8/1995 |

OTHER PUBLICATIONS

Machine Translation of the Description Portion of CN102606821A, taken from the EPO on Sep. 23, 2022.*

* cited by examiner

*Primary Examiner* — Zachary T Dragicevich
*Assistant Examiner* — James A Linford
(74) *Attorney, Agent, or Firm* — Sofer & Haroun, LLP

(57) ABSTRACT

A plug-in coupling for connecting a first to a second double-walled, vacuum-insulated cryogenic line includes a coupling plug and a coupling socket. The coupling plug has an inner and an outer pipe piece and a first connecting flange and is connected to the first cryogenic line. The coupling socket has an inner and an outer pipe piece and a second connecting flange and is connected to the second cryogenic line. In an assembled state of the plug-in coupling, the coupling plug has been plugged into an open annular gap in the coupling socket. The annular gap is surrounded both at its inner circumference and at its outer circumference by an insulating vacuum, whereby the thermal insulation of the plug-in coupling is improved. This construction makes possible a shorter design of the plug-in coupling, which, while achieving good thermal insulation, is space-saving and easy to handle.

9 Claims, 4 Drawing Sheets

JOHNSTON COUPLING WITH ADDITIONAL VACUUM ENCLOSURE

RELATED APPLICATION

This application claims the benefit of European Patent Application No. 20 305 040.6, filed on Jan. 17, 2020, the entirety of which is incorporated by reference.

FIELD

The invention relates to a plug-in coupling for vacuum-insulated flexible lines, which is also known by the term "Johnston coupling". In particular, the invention relates to a Johnston coupling with additional vacuum enclosure.

BACKGROUND

Supercooled media, also referred to as cryogenic liquids, are commonly transported on ships, in tanker wagons or on tanker trucks. One important example of these is liquid natural gas (LNG), which has an evaporation temperature of −162° C. (111 K). Loading is typically performed using non-insulated lines and couplings, which ice up during the loading process. The lack of thermal insulation leads to the evaporation of a proportion of the supercooled medium, which is associated with an energy loss because the evaporated medium must be liquefied again at some other location with great expenditure of energy.

In the case of the loading of even colder media, for example liquid hydrogen (evaporation temperature −253° C., 20 K) or liquid helium (evaporation temperature −269° C., 4 K), the oxygen in the ambient air, the evaporation temperature of which is relatively high (−183° C.; 90 K), would condense on the surface of non-insulated lines and couplings. This is extremely undesirable because a potential fire hazard is greatly increased by liquid oxygen.

Furthermore, for the transport of such cryogenic liquids or media, vacuum-insulated lines are also known which are produced for example by the company Nexans. For tank filling and loading purposes, the vacuum-insulated lines must be of flexible form and equipped at one end with a so-called Johnston coupling, by means of which two cryogenic lines are connectable without the thermal insulation being lost at the connecting point. In this way, icing of the coupling point and losses of the cryogenic medium as a result of evaporation are reduced. A Johnston coupling is disclosed for example in EP 1 957 851 B1.

In simple terms, in the case of a Johnston coupling, two double-walled vacuum-insulated pipelines are plugged one inside the other. The inner diameters of such pipelines are typically between 20 mm and 150 mm. Smaller or larger inner diameters are however basically also possible. The male part (inner double-walled pipeline) is plugged into the female part (outer double-walled pipeline). These are also referred to as coupling plug and coupling socket. In this way, the outer surface is thermally insulated with respect to the inner media-conducting pipe in a highly effective manner. For this purpose, the two double-walled pipelines must be plugged one inside the other over a predetermined length. Depending on the medium and desired thermal insulation, typical pipe-in-pipe lengths lie in the range of 200 mm to 600 mm. Deviations towards smaller or greater lengths are possible in individual applications.

Owing to the relatively large pipe-in-pipe lengths, the introduction of the male coupling part into the female coupling part is not straightforward, because the cryogenic line with the male coupling plug has a considerable weight, and furthermore, the coupling plug should as far as possible not rub along against the interior region of the coupling socket, in order to prevent damage to the surface.

In order to address these difficulties, the European patent application 18306761.0 proposes a Johnston coupling with a linear displacement unit. The displacement unit is a mechanical aid which facilitates the insertion of the coupling plug into the coupling socket.

Taking this as a starting point, it is the object of the present invention to create a plug-in coupling for vacuum-insulated cryogenic lines, which plug-in coupling solves or at least alleviates the above-stated problems.

SUMMARY OF THE INVENTION

To achieve this object, the invention proposes, according to a first aspect, a plug-in coupling for connecting a first to a second double-walled vacuum-insulated cryogenic line. The plug-in coupling comprises a coupling plug and a coupling socket. The coupling plug has an inner and an outer pipe piece and a first connecting flange and is connected to the first cryogenic line. The coupling socket has an inner and an outer pipe piece and a second connecting flange and is connected to the second cryogenic line. The plug-in coupling according to the invention is characterized in that, between the inner and the outer pipe piece of the coupling socket, there is formed an annular gap which is open in the region of the second connecting flange and which is surrounded both at its inner circumference and at its outer circumference by an insulating vacuum.

The insulating vacuums which adjoin the inner circumference and outer circumference of the open annular gap improve the thermal insulation of the plug-in coupling. In simple terms, it is achieved by means of the proposed construction that the path that the heat penetrating from the outside into the plug-in coupling must cover before the heat reaches a media-conducting line is lengthened. In this way, for a particular length of a plug-in coupling, improved thermal insulation is achieved in relation to conventional Johnston couplings known in the prior art. Conversely, the plug-in coupling according to the invention can be of shorter construction in relation to a conventional Johnston coupling in order to attain a similar level of thermal insulation. The shorter structural form of the plug-in coupling has advantages in terms of handling, in particular when the coupling plug is to be inserted into the coupling socket. The shorter design facilitates the insertion of the male coupling part into the female coupling part and is more space-saving, and the sealing is simpler owing to the less influential angle tolerance.

In practical use, it has therefore proven to be expedient if, when the plug-in coupling has been assembled, the coupling plug has been plugged into the open annular gap.

In one advantageous embodiment, on the coupling socket, there is arranged a seal holder which bears a seal. The coupling serves the purpose of sealing off the media-conducting lines. It is basically also possible for such a seal to be arranged in the region of the coupling plug. In the case of the proposed embodiment, the seal on the coupling socket is freely accessible for maintenance purposes and can therefore be easily exchanged if required.

The outer and the inner pipe piece of the coupling plug are advantageously connected in each case by way of a first end to the first connecting flange and by way of the in each case second end to a connecting ring. Between the inner and the outer pipe piece, there is formed an annular gap in which an insulating vacuum prevails. The insulating vacuum in the coupling plug contributes to the thermal insulation of the plug-in coupling as a whole.

In one advantageous refinement, the annular gap is connected via at least one flow channel to an insulating vacuum in the first cryogenic line. In general, the insulating vacuum of the cryogenic line is pumped in any case, such that no additional measures are required to generate the insulating vacuum in the coupling plug.

In one expedient refinement, the second connecting flange is connected to an outer pipe of the second cryogenic line.

The inner pipe piece may be connected to the outer pipe piece of the coupling socket by means of a connecting ring. The connecting ring closes off an annular gap between the inner and the outer pipe piece of the coupling socket, which is open on its other side in order to receive the coupling plug.

In one refinement of the plug-in coupling according to the invention, the coupling socket and the coupling plug have mutually complementary centring means. The centering means ensure that the coupling plug is seated in a correctly centred manner in the coupling socket.

In one particularly advantageous embodiment of the plug-in coupling, the inner pipes of the first and second cryogenic line are, in the region of the plug-in connection, is thermally insulated with respect to the exterior space by three insulating vacuums layered one above the other, wherein "layered one above the other" is to be understood in the sense that three spaces which are in each case delimited with respect to one another delimit the insulating vacuums. The delimited spaces are situated one above the other as viewed in a radial direction.

According to a second aspect of the invention, a loading facility for cryogenic fluids having a plug-in coupling according to the first aspect of the invention is proposed. The loading facility realizes all advantages that have been described in conjunction with the plug-in coupling.

BRIEF DESCRIPTION OF THE DRAWING

The invention will be discussed in more detail below by way of example on the basis of two exemplary embodiments and with reference to the accompanying figures. All the figures are purely schematic and not to scale. In the figures.

Identical or similar elements are provided with identical or similar reference signs in the figures.

EXEMPLARY EMBODIMENT

Figure 1:
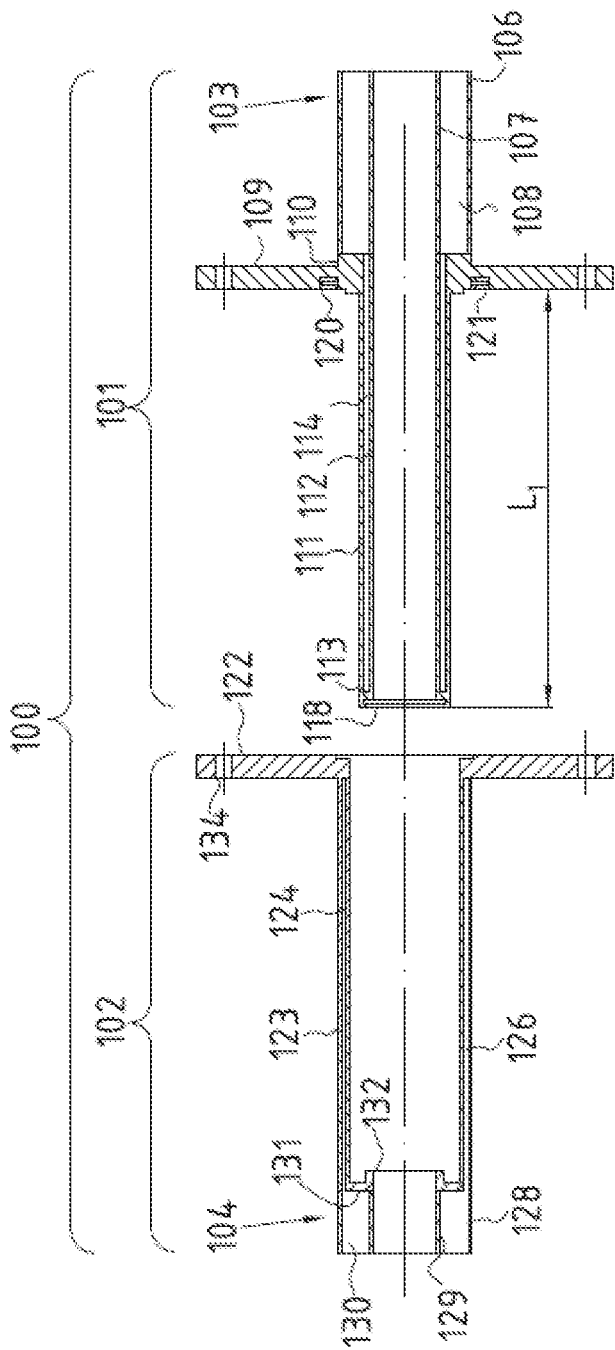
FIG. 1 is a schematic cross-sectional illustration of a conventional plug-in coupling in the separated state.

FIG. 1 shows a conventional plug-in coupling which is denoted as a whole by the reference designation 100. The plug-in coupling 100 includes a coupling plug 101 and a coupling socket 102, which in FIG. 1 are illustrated prior to assembly and with a small spacing to one another.

The coupling plug 101 is connected to a first cryogenic line 103, and the coupling socket 102 is connected to a second cryogenic line 104. The first cryogenic line 103 has an outer pipe 106 and an inner pipe 107 which are separated from one another by an intermediate space 108 and are thermally insulated with respect to one another by an insulating vacuum in the intermediate space 108. The cryogenic lines 103, 104 are double-walled vacuum-insulated cryogenic lines.

The coupling plug 101 comprises a first connecting flange 109, an outer pipe piece 111 and an inner pipe piece 112. The outer pipe 106 of the first cryogenic line 103 is welded to a projection 110 of the first connecting flange 109. On the opposite main surface of the connecting flange 109, the outer pipe piece 111 is welded to the first connecting flange 109. A distal end 113, which is remote from the first connecting flange 109, of the outer pipe piece 111 is connected to the inner pipe piece 112, which extends to the first connecting flange 109 and which is connected to the inner pipe 107 of the first cryogenic line 103. An annular gap 114 is formed between the outer pipe piece 111 and the inner pipe piece 112. The intermediate space 108 is connected in terms of flow to the annular gap 114, such that the insulating vacuum extends into the annular gap 114 and ensures good thermal insulation of the inner pipe piece 112.

At the distal end 113 of the coupling plug 101, the outer pipe piece 111 is somewhat longer than the inner pipe piece 112 and forms a protruding edge 117 which holds a circular annular seal 118 which bears against the distal end 113 of the coupling plug 101. The seal 118 is produced for example from an electrically insulating material, for example from polytetrafluoroethylene (PTFE) or Torlon®. In other embodiments, the seal 118 is produced from electrically conductive material. Cut into the first connecting flange 109 is an annular groove 120 into which a seal 121 is inserted. The seal 121 in the warm region of the plug-in coupling ensures that no evaporated medium escapes even if the seal 118 does not fully seal off the plug-in coupling. The spacing between the seal 118 and the first connecting flange 109 will hereafter also be referred to as length $L_1$ of the coupling plug 101.

The coupling socket 102 has a second connecting flange 122, an outer pipe piece 123 and an inner pipe piece 124. The pipe pieces 123, 124 are welded in each case by way of one end to the second connecting flange 122, wherein, in turn, an annular gap 126 is formed between the pipe pieces 123, 124. The respective other ends of the pipe pieces 123, 124 are connected to the second cryogenic line 104. The second cryogenic line has an outer pipe 128 and an inner pipe 129. Between the outer pipe 128 and the inner pipe 129, there is formed an intermediate space 130 in which an insulating vacuum prevails which thermally insulates the inner pipe 129. The outer pipe 128 of the second cryogenic line 104 is connected to the outer pipe piece 123, and the inner pipe 129 is connected to the inner pipe piece 124 of the coupling socket 102 via a connecting ring 131. The intermediate space 130 is connected in terms of flow to the annular gap 126. The insulating vacuum extends into the annular gap 126 of the coupling socket 102 and ensures good thermal insulation of the inner pipe piece 124 of the coupling socket 102.

Figure 2:
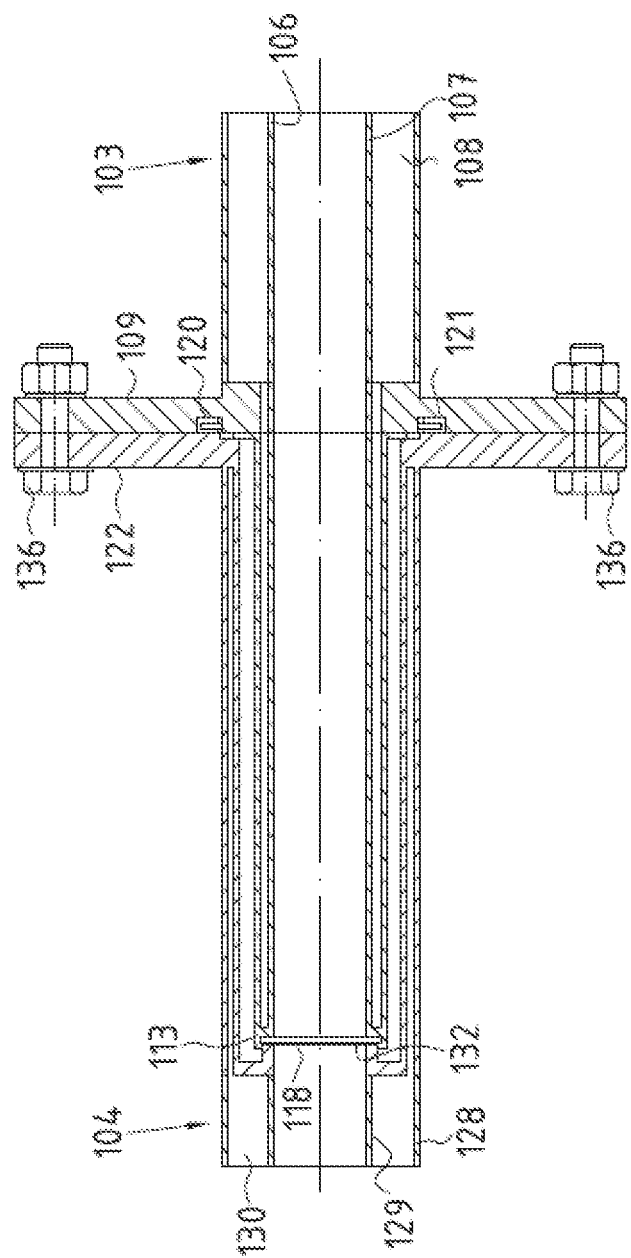
FIG. 2 shows the plug-in coupling from FIG. 1 in the assembled state.

On the connecting ring 131, there is formed an annular seat 132 for the seal 118, which bears against the seat 132 when the coupling plug 101 has been plugged fully into the coupling socket 102 (FIG. 2).

FIG. 2 shows the plug-in coupling 100 from FIG. 1 in an assembled state in which the first and the second connecting flange 109, 122 have been pressed against one another by means of fastening screws 136. The distal end 113 of the coupling plug 101 presses the seal 118 onto the seat 132 of the coupling socket 102. Here, the seal 118 seals off the transition between the coupling plug 101 and the coupling socket 102. Since the seal 118 is in contact with supercooled media during the operation of the plug-in coupling, 100 percent leak-tightness is not ensured under all circumstances. If supercooled medium passes the seal 118 and enters an intermediate space between the outer pipe 111 of the coupling plug 101 and the inner pipe 124 of the coupling socket 102 and evaporates there, then the seal 121, which is arranged in the warm region of the first and second connecting flange 109, 122 respectively, prevents evaporated medium from escaping from the plug-in coupling into the environment. In the case of combustible media such as liquid natural gas or liquid hydrogen, such an escape is extremely undesirable.

The media-conducting inner pipes 112, 124 of the plug-in coupling 100 are well insulated with respect to the outer surface of the plug-in coupling by means of the insulating vacuums. A transfer of heat however takes place in particular where the inner pipe 112 is connected to the outer pipe 111 of the plug-in coupling 101 and where the inner pipe 124 is connected to the outer pipe 123 of the coupling socket 102. Heat that ingresses from the outside must cover the path along the length of the vacuum-insulated region of the plug-in coupling 100 in order to reach the medium being conducted in the inner pipes of the plug-in coupling. For this reason, the thermal insulation in the case of the plug-in coupling 100 is better the longer the plug-in coupling is designed to be. However, with increasing length of the plug-in coupling 100, the handling thereof becomes ever more difficult. In other words: In the interests of good thermal insulation, the plug-in coupling should be as long as possible, and in the interests of ease of handling, the plug-in coupling should be as short as possible. Plug-in couplings implemented in practice generally constitute a compromise between these opposing requirements.

Figure 3:
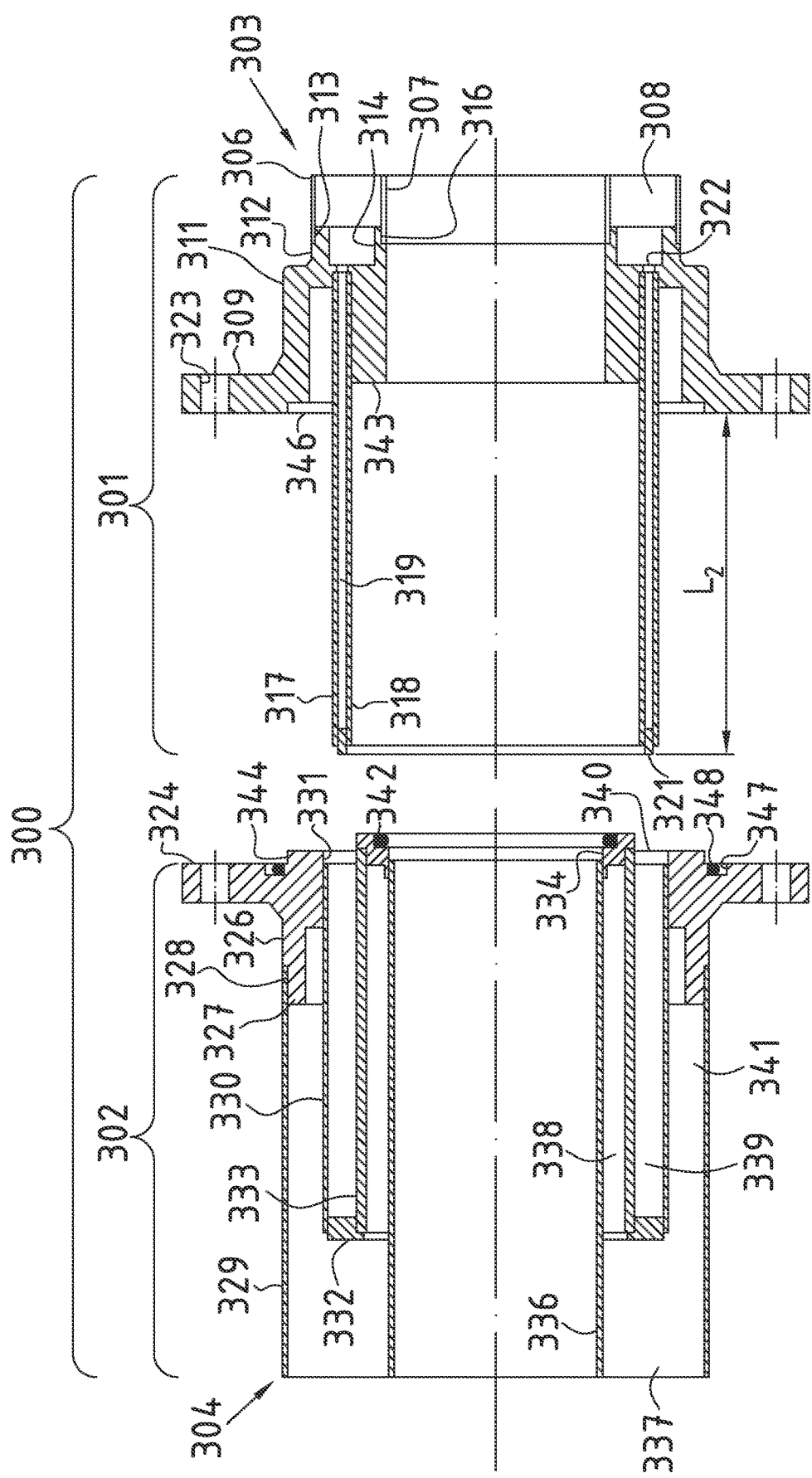
FIG. 3 is a schematic cross-sectional illustration of a plug-in coupling according to the invention in the separated state.

FIG. 3 illustrates an exemplary embodiment of a plug-in coupling 300 according to the invention schematically and in cross section. The plug-in coupling 300 has a coupling plug 301 and a coupling socket 302, which in FIG. 3 are illustrated prior to assembly and with a small spacing to one another.

The coupling plug 301 is connected to a first cryogenic line 303, and the coupling socket 302 is connected to a second cryogenic line 304. The first cryogenic line 303 has an outer pipe 306 and an inner pipe 307 which are separated from one another by an intermediate space 308 and are thermally insulated with respect to one another by an insulating vacuum in the intermediate space 308. The cryogenic lines 303, 304 are double-walled vacuum-insulated cryogenic lines.

The coupling plug comprises a first connecting flange 309, which transitions into a cylindrical attachment region 311. The attachment region 311 is connected to an encircling outer attachment piece 312, on the outer circumference of which there is formed a receptacle 313 for the outer pipe 306 of the cryogenic line 303. The outer pipe 306 is welded to the attachment piece 312. Furthermore, the attachment region 311 has an encircling inner attachment piece 314, on the inner circumference of which there is formed a receptacle 316 for the inner pipe 307 of the cryogenic line 303. The inner pipe 307 is likewise welded to the attachment piece 314.

An outer pipe piece 317 and an inner pipe piece 318 are welded to the attachment region 311 on the side situated opposite the cryogenic line 303, wherein the outer pipe piece 317 and the inner pipe piece 318 are spaced apart from one another in a radial direction such that an annular gap 319 forms between the outer pipe piece 317 and the inner pipe piece 318. At the end averted from the attachment region 311, the outer pipe piece 317 and the inner pipe piece are connected to one another in vacuum-tight fashion by means of a connecting ring 321. The annular gap 319 is connected in terms of flow to the intermediate space 308 of the first cryogenic line 303 via at least one flow channel 322, such that an insulating vacuum also prevails in the annular gap 319. For the assembly of the coupling plug 301 on the coupling socket 302, through-holes 323 for fastening screws (not illustrated) are provided.

The coupling socket 302 has a second connecting flange 324, which transitions is into an attachment region 326. The attachment region 326 is connected to an encircling outer attachment piece 327, on the outer circumference of which there is formed a receptacle 328 for an outer pipe 329 of the cryogenic line 304. The outer pipe 329 is welded to the attachment piece 327.

An outer pipe piece 330 of the coupling socket 302 is welded in a central opening 331 of the second connecting flange 324. By means of a connecting ring 332, that end of the outer pipe piece 330 which is averted from the connecting flange 324 is connected in a vacuum-tight manner to an inner pipe piece 333 of the coupling socket. The other end of the inner pipe piece 333 is welded in a receptacle on the outer circumference of a seal holder 334. An inner pipe 336 of the second cryogenic line 304 is welded to an inner circumference of the seal holder 334.

The outer pipe 329 and the inner pipe 336 of the second cryogenic line 304 delimit an intermediate space 337 in which an insulating vacuum prevails. Formed between the inner pipe piece 333 of the coupling socket 302 and the inner pipe 336 of the cryogenic line 304 is an annular gap 338 which is connected in terms of flow to the intermediate space 337. Accordingly, insulating vacuum also prevails in the annular gap 338. Between the outer pipe piece 331 and the inner pipe piece 333, there is formed an annular gap 339 which, on one side, is closed off by the connecting ring 332 and which, on the other side, is open in the region of the second connecting flange 324 and which thus forms a circular annular insertion opening for the coupling plug 301. Insulating vacuum likewise prevails in an annular space 341 which extends around the annular gap 339. At an end side facing towards the coupling plug, there is arranged on the seal holder 334 a seal 342 which, in the assembled state of the plug-in coupling 300, lies on a seat 343 in the coupling plug 301 and seals off the media-conducting inner pipes 307, 336 of the first and second cryogenic line 303, 304 respectively (FIG. 4).

On the second connecting flange 324, there is formed an annular projection 344 which fits into a corresponding recess 346 in the first connecting flange 309 of the coupling plug 301. The spacing between the connecting ring 321 and the first connecting flange 309 corresponds to the length $L_2$ of the coupling plug 301.

The second connecting flange 324 furthermore has an annular groove 347, in which a seal 348 is received. The seal 348 prevents evaporated medium from escaping from the plug-in coupling 300 if the seal 342 does not completely seal off the inner pipes 307, 336.

Figure 4:
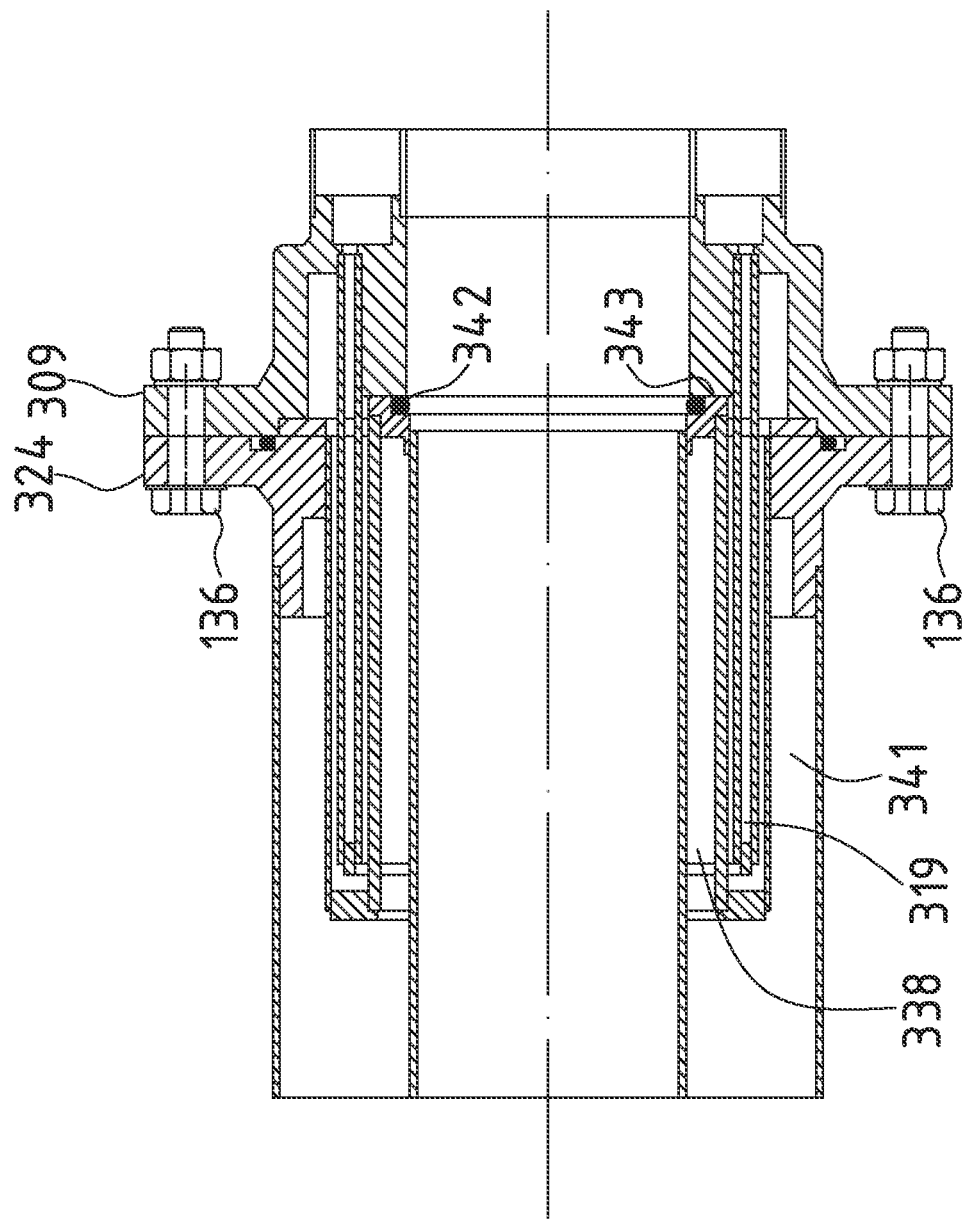
FIG. 4 shows the plug-in coupling from FIG. 3 in the assembled state.

FIG. 4 shows the plug-in coupling 300 in an assembled state in which the is connecting flanges 309 and 324 are pressed against one another by means of connecting fastening screws 136. The annular projection 344 is received in the recess 346 and centres the coupling plug 301 on the coupling socket 302. The annular projection 344 and the recess 346 form mutually complementary centring means. In other exemplary embodiments, it is also possible for other centring means to be provided. The coupling plug 301 has been plugged fully into the coupling socket 302, such that the seal 342 lies against the seat 343 in the coupling plug and seals off the inner pipes 306, 336. Three layers of insulating vacuums are thus situated one above the other in the region of the plug-in coupling 300. These are, as viewed from the inside to the outside in a radial direction, the annular gap 338 in the coupling socket 302, the annular gap 319 in the coupling plug 301, and the annular space 341 in the coupling socket 302. Therefore, in the case of the plug-in coupling 300, the path that the heat that ingresses from the outside must cover is approximately twice the length $L_2$ of the coupling plug 301. For an equal length of the plug-in coupling 300, the thermal insulation thereof is better in relation to the plug-in coupling 100 shown in FIG. 2.

Conversely, for a predefined effect of thermal insulation, a plug-in coupling 300 is to be designed to be shorter than a plug-in coupling 100, which is illustrated by different lengths $L_1$ and $L_2$ respectively of the coupling plugs 101 and 301 respectively illustrated in FIGS. 1 and 3, wherein $L_1$ is approximately 1.3 times $L_2$. In other exemplary embodiments, the length proportions may also be different.

The shorter structural length of the plug-in coupling 300 simplifies the handling thereof. Furthermore, the coupling 300 is space-saving, and the sealing in the region of the seal 342 is simpler owing to the less influential angle tolerance, because the seal 342 deviates less from an optimum position on the seat 343 if the coupling plug 301 is plugged not exactly concentrically into the coupling socket 302.

LIST OF REFERENCE DESIGNATIONS

100 Plug-in coupling
101 Coupling connector
102 Coupling socket
103 First cryogenic line
104 Second cryogenic line
106 Outer pipe
107 Inner pipe
108 Intermediate space
109 First connecting flange
111 Outer pipe piece
112 Inner pipe piece
113 Distal end
114 Annular gap
117 Protruding edge
118 Seal
120 Annular groove
121 Seal
122 Second connecting flange
123 Outer pipe piece
124 Inner pipe piece
126 Annular gap
128 Outer pipe
129 Inner pipe
130 Intermediate space
131 Connecting ring
132 Seat
300 Plug-in coupling
301 Coupling connector
302 Coupling socket
303 First cryogenic line
304 Second cryogenic line
306 Outer pipe
307 Inner pipe
308 Intermediate space
309 First connecting flange
311 Attachment region
312 Outer attachment piece
313 Receptacle
314 Inner attachment piece
316 Receptacle
317 Outer pipe
318 Inner pipe
319 Annular gap
321 Connecting ring
322 Flow channel
323 Through-holes
324 Second connecting flange
326 Attachment region
327 Outer attachment piece
328 Receptacle
329 Outer pipe
330 Outer pipe
331 Central opening
332 Connecting ring
333 Inner pipe
334 Seal holder
336 Inner pipe
337 Intermediate space
338 Annular gap
339 Open annular gap
340 Insertion opening
341 Annular space
342 Seal

The invention claimed is:

1. A plug-in coupling for connecting a first to a second double-walled, vacuum-insulated cryogenic line, each cryogenic line having media-conducting inner pipe wherein the plug-in coupling comprises:
    a coupling plug and a coupling socket,
    wherein the coupling plug has an inner and an outer pipe piece and a first connecting flange and is connected to the first cryogenic line,
    wherein the coupling socket has an inner and an outer pipe piece and a second connecting flange and is connected to the second cryogenic line, wherein between the inner and the outer pipe piece of the coupling socket, there is formed an annular gap which is open in the region of the second connecting flange and which is surrounded both at its inner circumference and at its outer circumference by an insulating vacuum,
    wherein the outer pipe piece of the coupling socket is welded to the second connecting flange and the end of the outer pipe piece remote from the second connecting flange is connected to one end of the inner pipe piece of the coupling socket in a vacuum-tight manner by means of a connecting ring,
    wherein the other end of the inner pipe piece of the second connecting flange is welded to a seal holder,
    wherein the media-carrying inner pipe of the second cryogenic line is welded to the seal holder, and
    wherein the seal holder bears a seal, which in the assembled state of the plug-in coupling is in contact with the coupling plug and seals the media-carrying inner pipes of the first and second cryogenic lines, respectively.

2. The plug-in coupling according to claim 1, wherein, when the plug-in coupling has been assembled, the coupling plug has been plugged into the open annular gap.

3. The plug-in coupling according to claim 1, wherein the outer and the inner pipe piece of the coupling plug are connected in each case by way of a first end to the first connecting flange and by way of the in each case second end to a connecting ring, wherein, between the inner and the outer pipe piece, there is formed an annular gap in which an insulating vacuum prevails.

4. The plug-in coupling according to claim 3, wherein the annular gap is connected via at least one flow channel to an insulating vacuum in the first cryogenic line.

5. The plug-in coupling according to claim 1, wherein the second connecting flange is connected to an outer pipe of the second cryogenic line.

6. The plug-in coupling according to claim 1, wherein the inner pipe piece is connected to the outer pipe piece of the coupling socket by means of a connecting ring.

7. The plug-in coupling according to claim 1, wherein the coupling socket and the coupling plug have mutually complementary centring means.

8. The plug-in coupling according to claim 1, wherein the inner pipes of the first and second cryogenic lines are, in the region of the plug-in connection, thermally insulated with respect to the exterior space by three insulating vacuums layered adjacent to one another.

9. A loading facility for cryogenic fluids having a plug-in coupling according to claim 1.

* * * * *